United States Patent [19]
Martinez et al.

[11] Patent Number: 5,808,922
[45] Date of Patent: Sep. 15, 1998

[54] INTEGRATED KEYBOARD

[76] Inventors: Daniel L. Martinez, 19825 N. 47th Ave., Glendale, Maricopa County, Ariz. 85308; Norm Ellison, Am Kurpark 4, Ehlscheid, Germany, 56581

[21] Appl. No.: 685,165

[22] Filed: Jul. 23, 1996

[51] Int. Cl.⁶ .................................................. G06F 3/00
[52] U.S. Cl. ...................... 364/709.11; 345/168; 361/680
[58] Field of Search .......................... 364/709.11, 708.1; 345/168; 361/680

[56] References Cited

U.S. PATENT DOCUMENTS

| | | | |
|---|---|---|---|
| 4,935,888 | 6/1990 | Heston et al. | 364/709.1 |
| 4,985,692 | 1/1991 | Breider et al. | 345/168 |
| 5,546,334 | 8/1996 | Hsieh et al. | 364/709.11 |
| 5,594,617 | 1/1997 | Foster et al. | 364/708.1 |

FOREIGN PATENT DOCUMENTS

| | | | |
|---|---|---|---|
| 2069197 | 8/1981 | United Kingdom | 345/168 |

*Primary Examiner*—Tan V. Mai
*Attorney, Agent, or Firm*—Anthony Miologos; Arthur A. Sapelli

[57] ABSTRACT

In a process control system, having a controller, a display unit, and a console, an integrated keyboard is mounted with the console. The integrated keyboard provides an interface between an operator and the process control system. The integrated keyboard comprises a frame, configured to mount with the console. A full-travel keyboard is also mounted on the frame. A wrist-rest plate is mounted on the frame between the full-travel keyboard and the operator. An operator control panel, having individual keys, is located in a recess between the wrist-rest plate and the operator, such that the individual keys are not accidentally activated by the operator. Lastly, a cursor control unit is mounted in the wrist-rest plate.

7 Claims, 4 Drawing Sheets

INTEGRATED KEYBOARD

BACKGROUND OF INVENTION

The present invention relates to a peripheral interface input device, and more particularly, to an integrated keyboard device having a variety of keys (including function keys, programmable and fixed) for inputting information to a digital controller unit.

In many present-day systems, an operator has been supplied with a keyboard which balances precariously on a pull-out shelf. Further, for cursor positioning, a separate mouse or trackball is required. However, in many instances no surface is provided for operating the cursor control device. The operator usually is faced with having to place the cursor positioning device on any flat surface available, which sometimes includes the top of the flat panel membrane keyboard, at which time the flat panel is obscured and unusable.

The integrated keyboard design of the present invention optimizes the user interface by smoothly integrating two flat panel membrane keyboards, a cursor position device, a full-travel keyboard, and a wrist rest area into one ergonomically-efficient unit.

SUMMARY OF THE INVENTION

Therefore, there is provided by the present invention an integrated keyboard for providing an improved and more ergonomically-efficient input device. In a process control system, having a controller, a display unit, and a console, an integrated keyboard is mounted with the console. The integrated keyboard provides an interface between an operator and the process control system. The integrated keyboard comprises a frame, configured to mount with the console. A full-travel keyboard is also mounted on the frame. A wrist-rest plate is mounted on the frame between the full-travel keyboard and the operator. An operator control panel, having individual keys, is located in a recess between the wrist-rest plate and the operator, such that the individual keys are not accidentally activated by the operator. Lastly, a cursor control unit is mounted in the wrist-rest plate. In the preferred embodiment a second keypanel is mounted essentially vertical to the full-travel keyboard on a spring-loaded fly door for access to the switches, disk drive openings, and the like, located behind the second keypanel. Alternately, the frame can be configured to rest on a desktop or other flat surface.

Accordingly, it is an object of the present invention to provide a keyboard for inputting information to a controller.

It is another object of the present invention to provide a keyboard for inputting information to a controller in an improved manner.

It is still another object of the present invention to provide a keyboard for inputting information to a controller in a more ergonomically-efficient manner.

These and other objects of the present invention will become more apparent when taken in conjunction with the following description and attached drawings, wherein like characters indicate like parts, and which drawings form a part of the present invention.

BRIEF DESCRIPTION OF THE DRAWINGS

FIG. 2, which comprises

FIG. 4, which comprises

DETAILED DESCRIPTION

Figure 1:
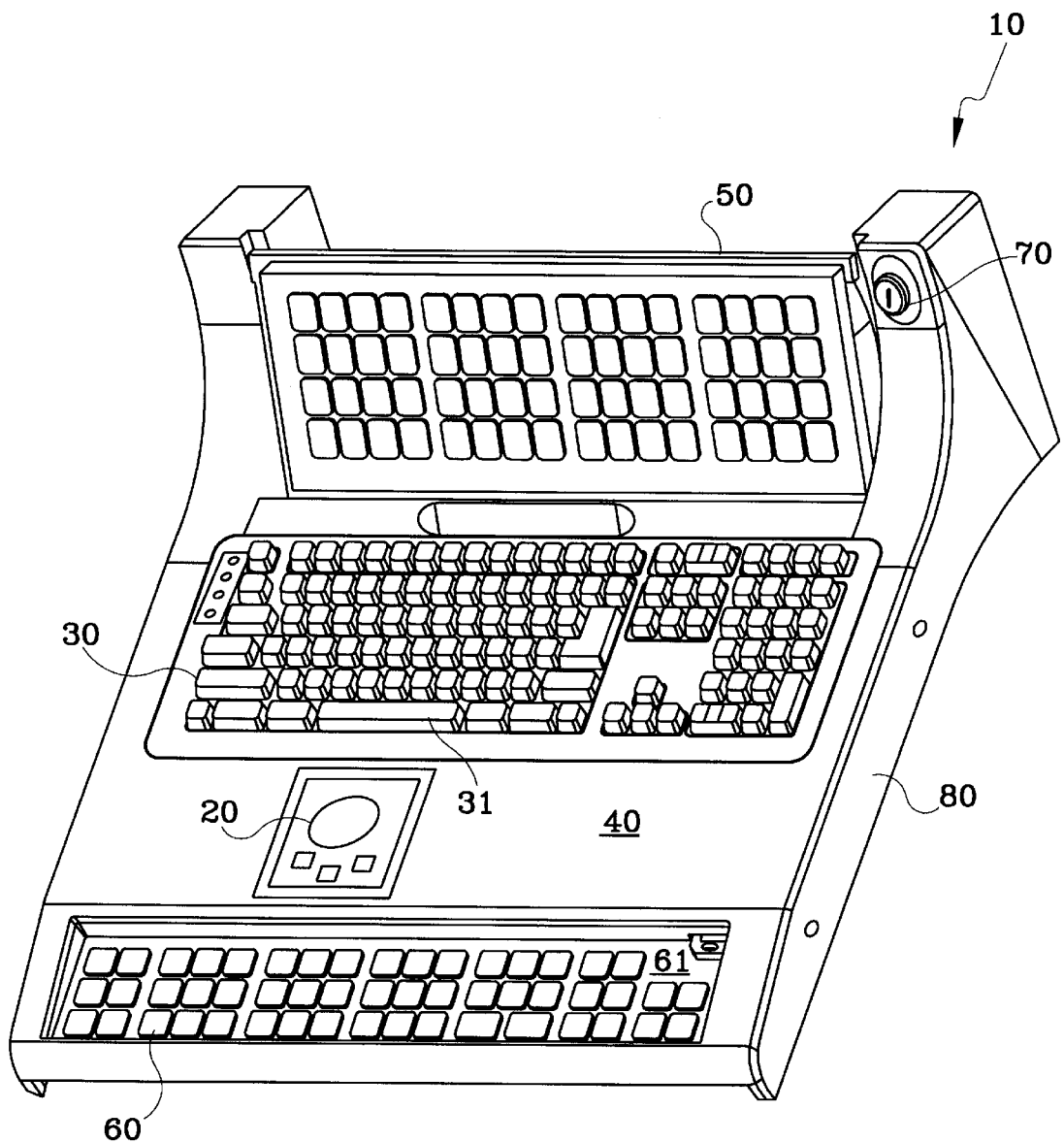
FIG. 1 shows an isometric view of an integrated keyboard of the preferred embodiment of the present invention.

Referring to FIG. 1, there is shown an isometric view of an integrated keyboard 10 of the preferred embodiment of the present invention. The integrated keyboard 10 of the preferred embodiment is intended for use in a process control system (not shown) and mounted in a console (not shown) of the process control system. The process control system includes a controller (not shown) and a display unit (not shown). The integrated keyboard 10, therefore, performs as an input/output peripheral device which interfaces with the controller (not shown) and the display unit (not shown) for transmitting and receiving information therebetween in a manner well understood by those skilled in the art.

The integrated keyboard 10 of the preferred embodiment of the present invention integrates a cursor positioning device 20, a full-travel keyboard 30, a wrist-rest area 40, and a first and second flat panel membrane keyboard 50, 60.

The first flat panel membrane keyboard 50, a relegendable function keypanel (RFKP), is integrated into a vertically-oriented flip-door for access to disk drives (not shown), which in the preferred embodiment, are located behind the first flat panel membrane keyboard 50. Vertical orientation provides a better view of alarm indicator LEDs, which are built into the panel in the process control system application. The vertical (or "tipped-up") orientation of the RFKP is very important since it optimizes viewability of the LEDs. LEDs have an inherent optimum cone of viewability. In keyboards which lie flat, the LEDs are sometimes hard to see due to the shallow view angle afforded the operator. With the RFKP 50 tilted up toward the operator, the LEDs are perceived much more brilliantly by the operator. The flip-door is spring loaded (not shown) so the door returns to the closed position when the user has finished accessing the disk drives. This ensures that any alarm conditions that occur will not be overlooked due to alarm indicator LEDs being obscured because the door was left down and open. A wrist-rest area 40 is built into the keyboard 10 for comfortable typing on the full-travel keyboard 30. A cursor control unit 20 is built into the integrated keyboard 10 in the wrist-rest area 40, essentially centered on the spacebar 31 of the full-travel keyboard 30. This positioning of the cursor control unit places it in a naturally comfortable position for manipulation with thumbs when the fingers are in the normal "home row" position for typing on the full-travel keyboard. An operator control panel, the second flat panel membrane keyboard 60, is located in a recess 61 between the wrist-rest area and the user. Recessing the operator control panel causes the user's lower arms to "bridge" over the operator control panel when the palms and wrists are resting on the wrist-rest area 40. This ensures that the membrane keys of the operator control panel will not be accidentally activated by palm, wrist, or lower-arm pressure when using the full-travel keyboard 30. In the preferred embodiment, a security key switch 70 is also provided. Although the preferred embodiment shows a trackball, other types of cursor control can be utilized, including thumb wheel, joystick, . . .

Figure 2A:
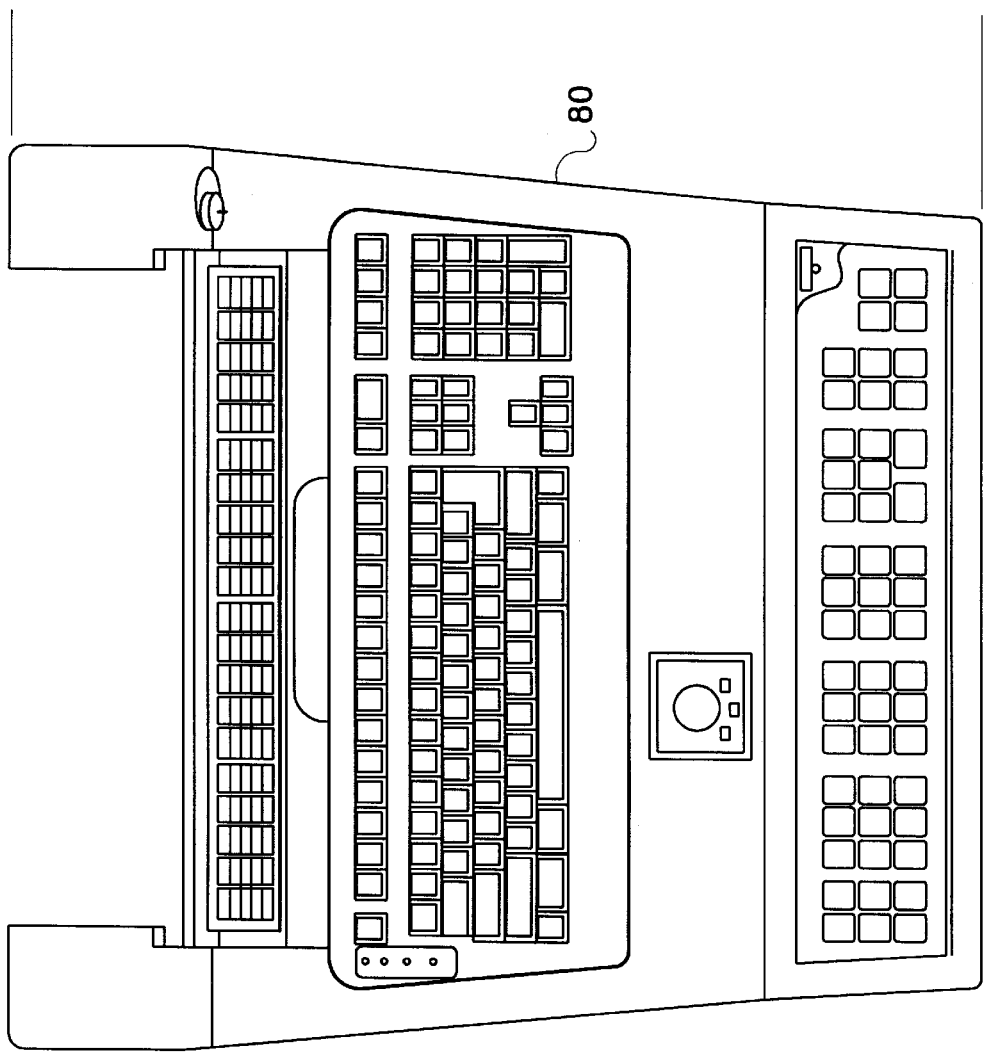
FIGS. 2A and 2B, shows a top and side view, respectively, of the integrated keyboard for use with a console-type structure.
Figure 2B:
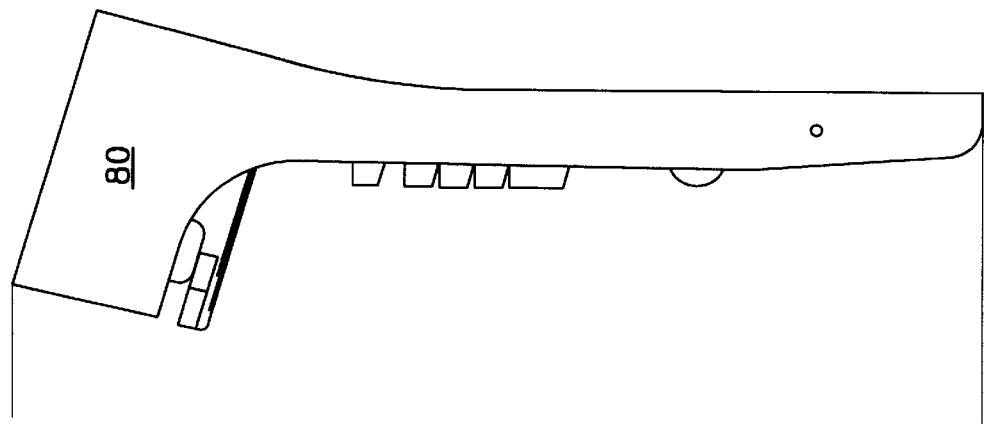

The integrated keyboard 10 is intended for use in a console, preferably a Z-console of the type shown in Design U.S. Pat. No. 362,426, assigned to the same assignee as the present application, or of the type shown in a design application Ser. No. 29/057,315, entitled, "Ergonomic Operator's Control Console", by Dennis Kodimer, and assigned to the same assignee as the present application. The framework 80 of the integrated keyboard 10 takes on a configuration to be housed in the console. FIG. 2, which comprises 2A and 2B, shows a top and side view, respectively, of the integrated keyboard 10 of the preferred embodiment of the present invention.

Figure 3:
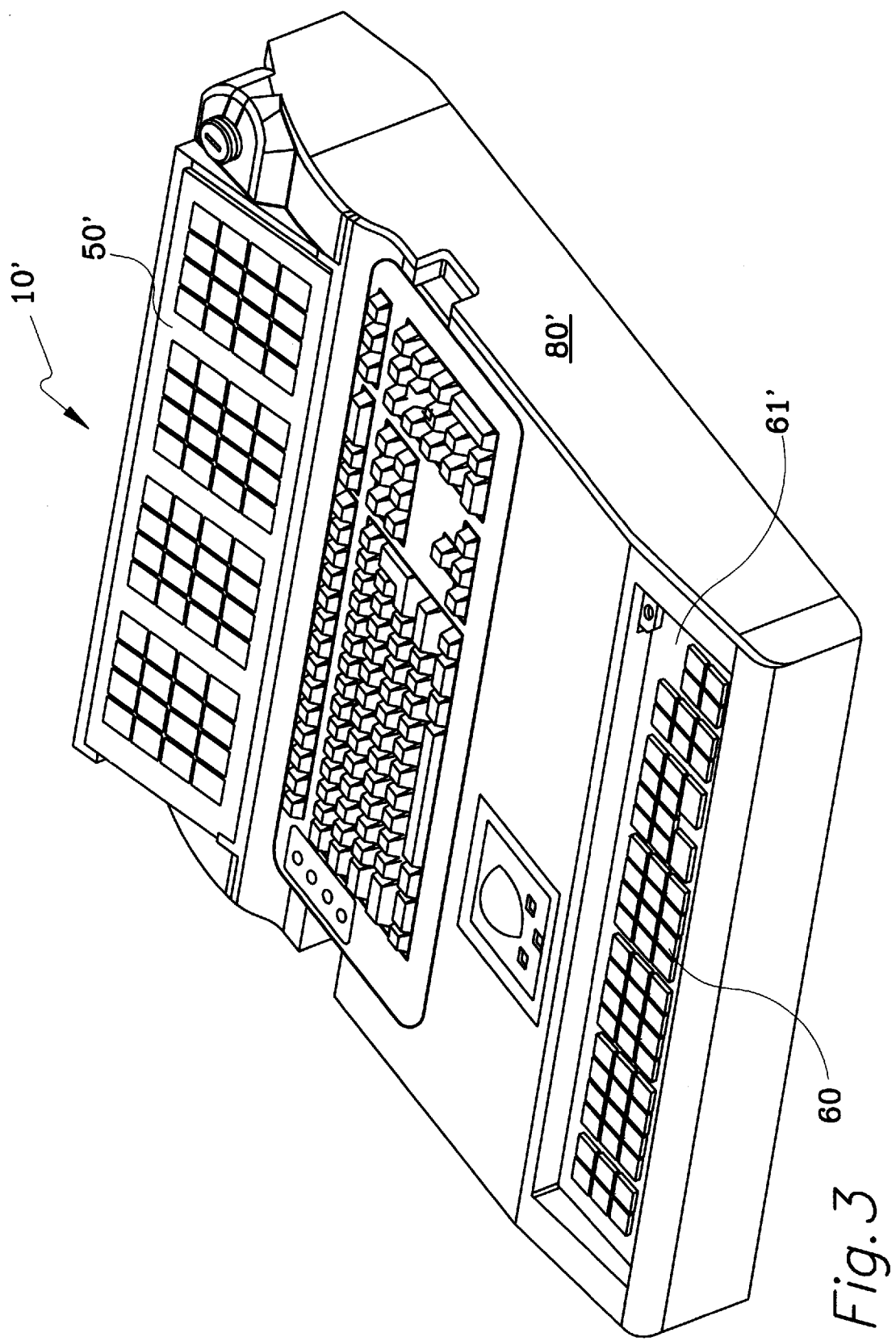
FIG. 3 shows an isometric view of an alternative embodiment of the integrated keyboard of the present invention intended for use on a desktop.

Referring to FIG. 3, there is shown an isometric view of an alternative embodiment of the integrated keyboard 10'. This embodiment is primarily designed for use as a desktop version but can also be used in process control consoles. The framework 80' is configured to be placed on a flat surface, such as a desktop. The first flat panel membrane keyboard 50' (the relegendable function keypanel, or sometimes referred to as 'keyboard') does not need to be on a flip-door since the integrated keyboard 10' is movable and does not block any access to disk drives (or other components). The second flat panel membrane keyboard 60' is still located in a recess 61'. Essentially all the features of the desktop version of the integrated keyboard 10' are essentially the same as those of the integrated keyboard 10, except for the features mentioned above.

Figure 4A:
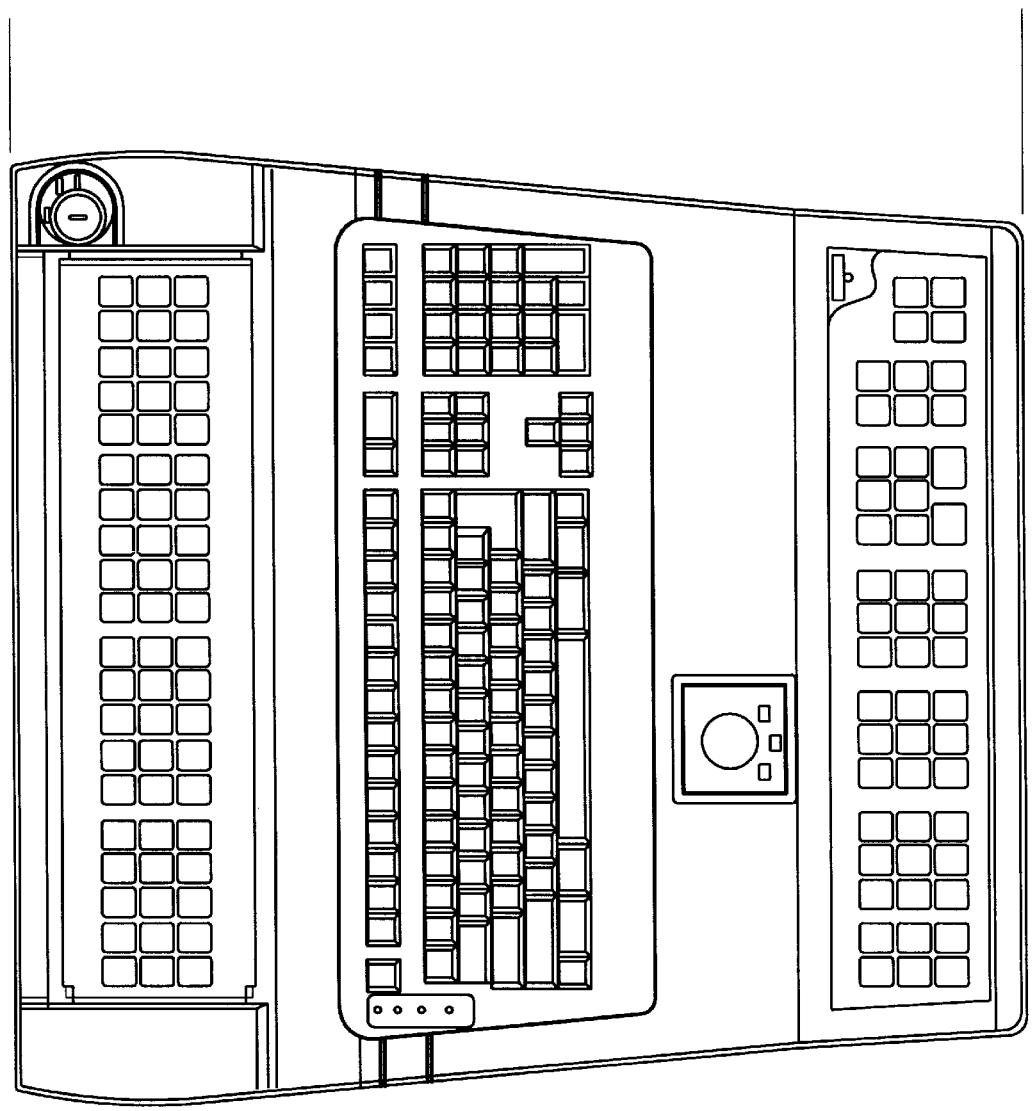
FIGS. 4A and 4B, shows a top and side view, respectively, of an alternative embodiment (desktop version) of the integrated keyboard of the present invention.
Figure 4B:
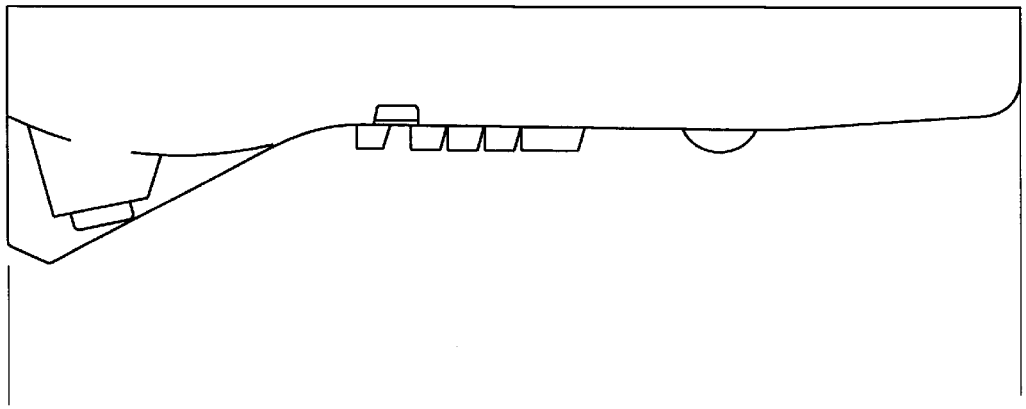

FIG. 4, which comprises FIGS. 4A and 4B, shows a top and side view, respectively, of the alternative embodiment of the integrated keyboard 10' of the present invention, the alternative embodiment being intended as a "desktop" version.

It will be understood by those skilled in the art that different type keyboards 30, 50, 60, integrated in various configurations, and different type cursor control devices can be utilized, all of which is intended to fall within the scope of the invention. The electrical connections/interconnections between the panels and a controller unit (not shown) are all done in a manner well known to those skilled in the art and are not discussed herein.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

What is claimed is:

1. In a process control system, having a controller, a display unit, a console, an integrated keyboard mounted with the console, the integrated keyboard providing an interface between an operator and the process control system, the integrated keyboard comprising:

a) a frame, configured to mount with the console;

b) a full-travel keyboard mounted on the frame;

c) a wrist-rest plate, mounted on the frame between the full-travel keyboard and the operator, d) an operator control panel, having individual keys, located in a recess between the wrist-rest plate and the operator, such that the accidental activation of the individual keys by the operator is reduced;

e) a cursor control unit mounted in the wrist-rest plate; and f) a keypanel mounted essentially vertical to and behind the full-travel keyboard where the keypanel is mounted on a flip-door on the frame, the flip-door being spring loaded such that the panel returns to the vertical position in a normal state.

2. In a process control system, the integrated keyboard of claim 1 wherein the panel is a relegendable function keypanel.

3. In a process control system, the integrated keyboard of claim 1, wherein the cursor control unit is essentially centered on the space bar of the full-travel keyboard.

4. In a process control system, the integrated keyboard of claim 3, wherein the cursor control unit is a trackball.

5. In a process control system, the integrated keyboard of claim 1, wherein the cursor control unit is a trackball.

6. In a process control system, the integrated keyboard of claim 1, further comprising a security switch.

7. In a process control system, having a controller, a display unit, a console, an integrated keyboard mounted with the console, the integrated keyboard providing an interface between an operator and the process control system, the integrated keyboard comprising:

a) a frame, leaving a flat bottom configured to mount on a desktop;

b) a full-travel keyboard mounted on the frame;

c) a wrist-rest plate, mounted on the frame between the full-travel keyboard and the operator;

d) an operator control panel, having individual keys, located in a recess between the wrist-rest plate and the operator, such that the accidental activation of the individual keys by the operator is reduced;

e) a cursor control unit mounted in the wrist-rest plate; and f) a keypanel mounted essentially vertical to and behind the full-travel keyboard where the keypanel is mounted on a flip-door on the frame, the flip-door being spring loaded such that the panel returns to the vertical position in a normal state.

\* \* \* \* \*